United States Patent [19]
Fallon et al.

[11] 3,995,117
[45] Nov. 30, 1976

[54] MESSAGE BILLING ARRANGEMENT FOR A COMMUNICATION SYSTEM

[75] Inventors: Joseph Rogers Fallon, Pickerington; Louis Gawron, Jr., Reynoldsburg; Richard Cline Hilton, Columbus, all of Ohio

[73] Assignee: Western Electric Company, Inc., New York, N.Y.

[22] Filed: Jan. 22, 1976

[21] Appl. No.: 651,558

[52] U.S. Cl. .............................. 179/7 R
[51] Int. Cl.² ........................ H04M 15/10
[58] Field of Search ............ 179/7 R, 7.1 R, 7.1 TD, 179/7 MM, 8 A, 18 E, 18 EB, 8 R

[56] References Cited
UNITED STATES PATENTS

| | | | |
|---|---|---|---|
| 2,585,904 | 2/1952 | Busch | 179/18 |
| 3,651,269 | 3/1972 | Le Strat et al. | 179/7 R |
| 3,653,003 | 3/1972 | Hemdal | 179/7 R |
| 3,697,695 | 10/1972 | Pommerening et al. | 179/7 MM |
| 3,748,392 | 7/1973 | Henquet et al. | 179/7 MM |
| 3,885,102 | 5/1975 | Henrickson | 179/7 R |
| 3,937,894 | 2/1976 | Grzybowski | 179/7.1 R |

Primary Examiner—Kathleen H. Claffy
Assistant Examiner—Gerald L. Brigance
Attorney, Agent, or Firm—Charles H. Davis

[57] ABSTRACT

An automatic message billing arrangement for use with a telephone system is disclosed. The billing arrangement monitors the trunks to ascertain when a trunk is seized for service. In response to a trunk being seized, the common control markers, which establish connections between the lines and trunks, are interrogated to determine which marker has seized the detected trunk. When the marker is found, the identity of the calling line to be connected to the trunk is ascertained from the marker. The calling line identity and trunk identity are used in recording the initial billing entry.

10 Claims, 7 Drawing Figures

MESSAGE BILLING ARRANGEMENT FOR A COMMUNICATION SYSTEM

FIELD OF THE INVENTION

This invention relates to communication systems and particularly, to arrangements for billing the users of a communications system.

In a more particular aspect, this invention relates to an automatic message accounting arrangement for use in a communications system wherein the gathering of billing data is initiated by the outgoing lines or trunks connected to the system.

BACKGROUND OF THE INVENTION

In a communications system, such as a telephone system, provisions are made for charging the customers according to their individual use of the system. Billing data such as the identity of the customer originating the call, the identity of the called customer, and the time of day that the call was made is generally recorded along with the time the called customer answers and the time of disconnect. This information can then be used to calculate the charges for billing the customers for each call.

There are many prior art message billing schemes used in telephony, and while they are generally suitable for their intended purpose, they lack certain features we have incorporated in the present arrangement.

In one known prior art arrangement a plurality of marker circuits common to the customer lines is used for controlling the establishment of connections through the switching system. During the processing of a call, the marker assembles the calling and called customer identities in order to establish this connection. It is undesirable, however, to detain the marker to permit the billing data to be recorded on a permanent media, since while the marker is being detained, it cannot be used for processing other calls. The marker, therefore, seizes another common circuit called a sender and passes the billing data to the sender which awaits service by the automatic message accounting system.

Senders are generally used for outpulsing the called number to a distant office; however, in these prior art billing arrangements a sender must always be used, even though no outpulsing is required such as on an intraoffice call.

Other prior art schemes provide toll ticketing equipment which is associated with the individual trunks of the telephone system. In some cases, each trunk is equipped with registers to record the calling and called customer identities along with the duration of the call. In other systems the ticketing equipment is shared by a group of trunks and is only associated with a trunk for the duration of the call. At some convenient time during a period of light traffic, the billing data stored in the toll ticketing equipment can be extracted by a data processor which computes the charges for the individual calls.

While this latter arrangement does not require the use of a sender on all calls, the provision of a multiplicity of toll ticketing registers associated with the trunks may be inefficient. Economics can be realized by centralizing the message billing functions under the control of a high speed data processor.

SUMMARY OF THE INVENTION

In accordance with the one illustrative embodiment of the invention, a data processor is provided to accumulate the message billing data for charging the users of a telephone communication system. More specifically, the data processor functions autonomously to monitor all outgoing lines, e.g., trunks, of the telephone system to ascertain when a particular trunk has changed state. When a trunk is initially seized by one of a plurality of common control circuits of the telephone system to complete a call, the trunk changes from an "idle" state to a "busy" state. This change of state is recognized by the processor and the processor initiates action to identify the customer using the trunk and the destination of the call. Since the connection through the telephone system is being established by one of the control circuits, the control circuit has already identified the destination of the call and the calling customer. The processor interrogates the various control circuits of the system to ascertain which control circuit has seized the trunk that has changed state. Once the control circuit has been identified, the billing data pertinent to the call can be gated from the control circuit into the processor. The processor can assemble the information for charging the customer or transmit the billing data to a centralized accounting center for processing.

Accordingly, it is an aspect of our invention that the message billing processor is driven by the trunk circuit upon seizure of a trunk circuit by a common control circuit.

It is a further aspect of our invention that the processor responsive to the seized trunk circuit ascertains which control circuit has seized the trunk circuit so that pertinent data for billing can be forwarded to the processor from that control circuit.

BRIEF DESCRIPTION OF THE DRAWING

A better understanding of the invention contemplated can be had with the following description made with reference to the drawing in which:

More specifically, FIG. 2 shows a portion of a trunk link network 103 with trunks OGT0 through OGT7;

FIG. 3 shows a more detailed block diagram representation of marker MKRO and originating register OR; and FIGS. 4–6 show accounting system 104 associated with the telephone switching system of FIGS. 2 and 3.

BRIEF DESCRIPTION OF THE ARRANGEMENT

Figure 1:
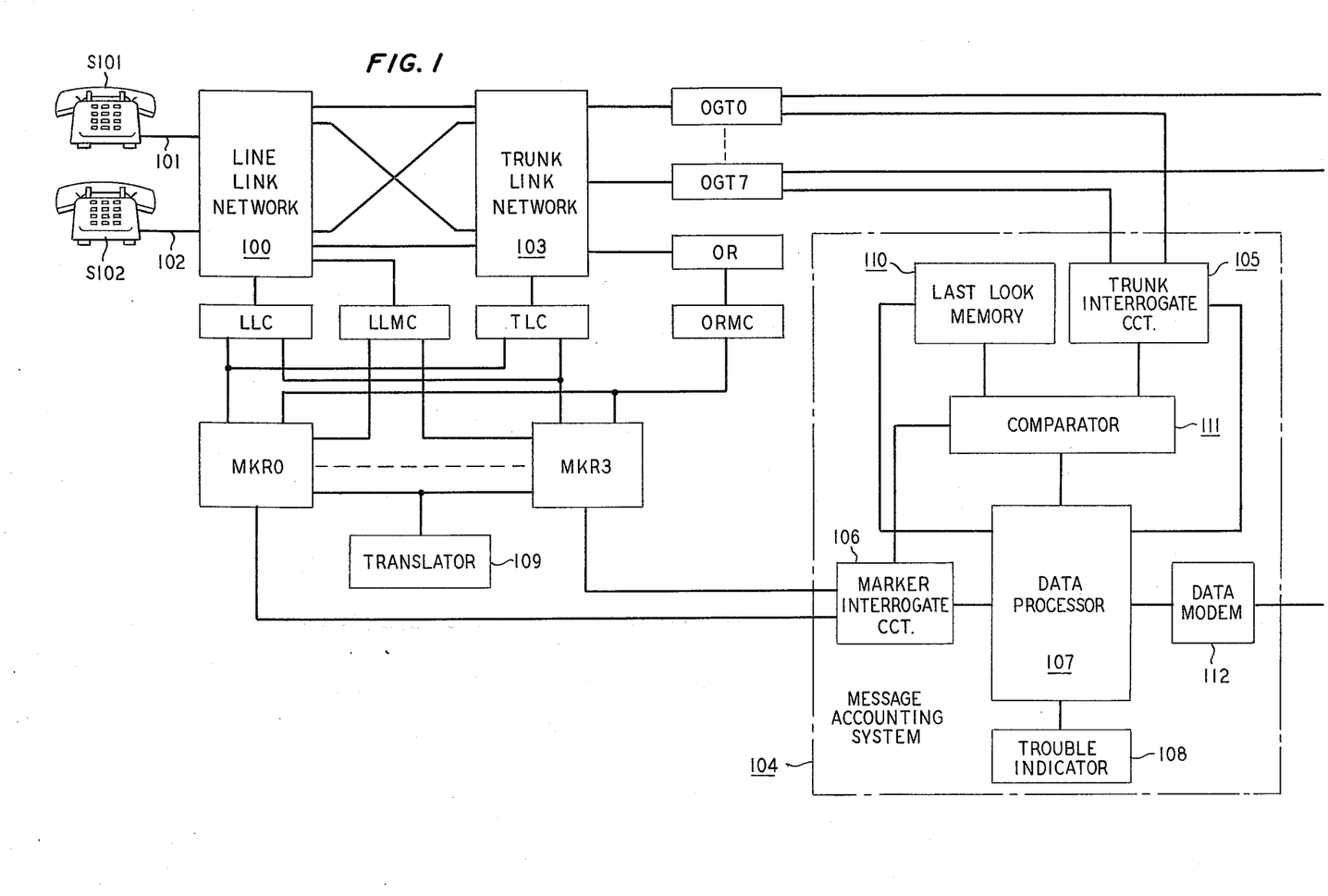
FIG. 1 shows a block diagram of a telephone switching system utilizing the invention.

FIG. 1 contains a symbolic representation of a specific illustrative embodiment of the invention employed in a telephone system similar to the telephone system more fully described in U.S. Pat. No. 2,,585,904 issued to A. J. Busch on Feb. 19, 1952. It will be recalled that the Busch patent discloses a telephone switching system comprising a line link network 100 on which customer lines 101 and 102 are terminated, a trunk line network 103 for terminating outgoing trunks OGT0 through OGT7, intraoffice trunks and originating registers such as OR. Connections are established between customer lines, trunks and originating registers under the control of a plurality of common control circuits called markers.

The number of markers provided in any given switching system depends on the traffic capacity of the system and in this illustrative embodiment it has been assumed that four markers designated MKR0 through MKR3 are sufficient to handle the traffic.

Also shown in block diagram form in FIG. 1 is a message accounting system 104 which interfaces the switching system via the trunks and the markers. The accounting system can be functionally divided into trunk interrogate circuit 105 which is operative to monitor the change of state of the individual trunk circuits, a marker interrogate circuit 106 which ascertains the status of the markers, and a data processor 107. Associated with the data processor 107 is a trouble indicator 108 for reporting irregularities in the operation of the accounting system.

To illustrate the operation of the arrangement, let it be assumed that a customer at station S101 originates a call requiring that detailed billing information be recorded for charging the customer. When the customer lifts his receiver at station S101, his line equipment in line link network 100 responds and bids for service by one of the markers MKR— through the line link marker connector LLMC. Assuming that marker MKR0 is idle, marker MKR0 identifies the line requesting service. In systems such as that described in the aforementioned Busch patent, the calling line equipment identity consists of a line link frame number and the switch terminal of the line on the frame comprising vertical group, horizontal group and vertical file information. Having ascertained the calling line identity, marker MKR0 seizes an idle trunk link frame in trunk link network 103 via trunk link connector TLC, seizes the line link frame via line link connector LLC and proceeds to select an idle originating register such as OR. Marker MKR0 interconnects the calling line 101 with originating register OR over a network channel and stores the calling line equipment identity in register OR and then releases.

Register OR returns dial tone to the customer at station S101 and the customer dials the directory number associated with the called line.

Register OR records the dialed number, and at the end of dialing, bids for an idle marker via originating register marker connector ORMC. Let it be assumed that marker MKR3 is idle, and after seizing marker MKR3, register OR transmits the calling line equipment identity and the called directory number to the marker.

Marker MKR3 utilizes the called directory number to ascertain the routing of the call. By examining the office code digits of the called number, marker MKR3 can select an outgoing trunk to the appropriate distant office. Let it be assumed that the call is destined for a distant switching office that is accessible via one of the trunks in the group OGT0 through OGT7 and marker MKR3 seizes the trunk OGT0 and the trunk link frame on which the trunk is terminated via trunk link connector TLC. From the resulting information, marker MKR3 also ascertains that detailed billing information will be required on this call so the marker utilizes translator 109 to convert the calling line equipment identity into the calling line directory number to which the call is to be charged. If the call were directed to a telephone station such as S102 served by the same switching office, translator 109 would also be used by the marker to translate the called directory number into the line equipment location of the called line, and an interoffice trunk (not shown) would be selected for the connection.

As mentioned above, message accounting system 104 functions autonomously to gather the billing information from the telephone switching system. Trunk interrogate circuit 105 monitors the outgoing and intraoffice trunks of the switching system by continuously scanning the trunks to detect when a trunk has changed status. The busy/idle status of each trunk is kept in a last-look memory 110. As the groups of trunks are scanned the present trunk status is compared in comparator 111 with the last-look status from memory 110. If a change of state has taken place, memory 110 is updated and the trunk that has changed state is identified. When a trunk changes state from idle to busy the accounting system must also record the identity of the calling customer connected to the trunk. In accordance with one aspect of our invention, marker interrogate circuit 106 interrogates each marker to ascertain which marker has seized outgoing trunk OGT0. Marker interrogate circuit 106 examines each marker to ascertain if the marker is busy and what trunk unit the busy marker is working with. When the interrogate circuit 106 examines marker MKR3 it ascertains that this marker is working with the trunk unit containing a trunk OGT0. If marker MKR3 has progressed in the processing of the call to the point where it has assembled the calling and called line identities, it will signal interrogate circuit 106 that the data is ready. Interrogate circuit 106 will then cause this data to be transmitted to data processor 107.

Typically, data processor 107 is a stored program controlled computer which can assemble the data and prepare a bill for charging the customer. In the alternative, the billing data can be loaded into a buffer associated with data modem 112 for transmitting the billing data to a centralized accounting office. The accounting office would then be capable of processing calls associated with many remote switching centers similar to the one shown in FIG. 1.

DETAILED DESCRIPTION

Figure 2:
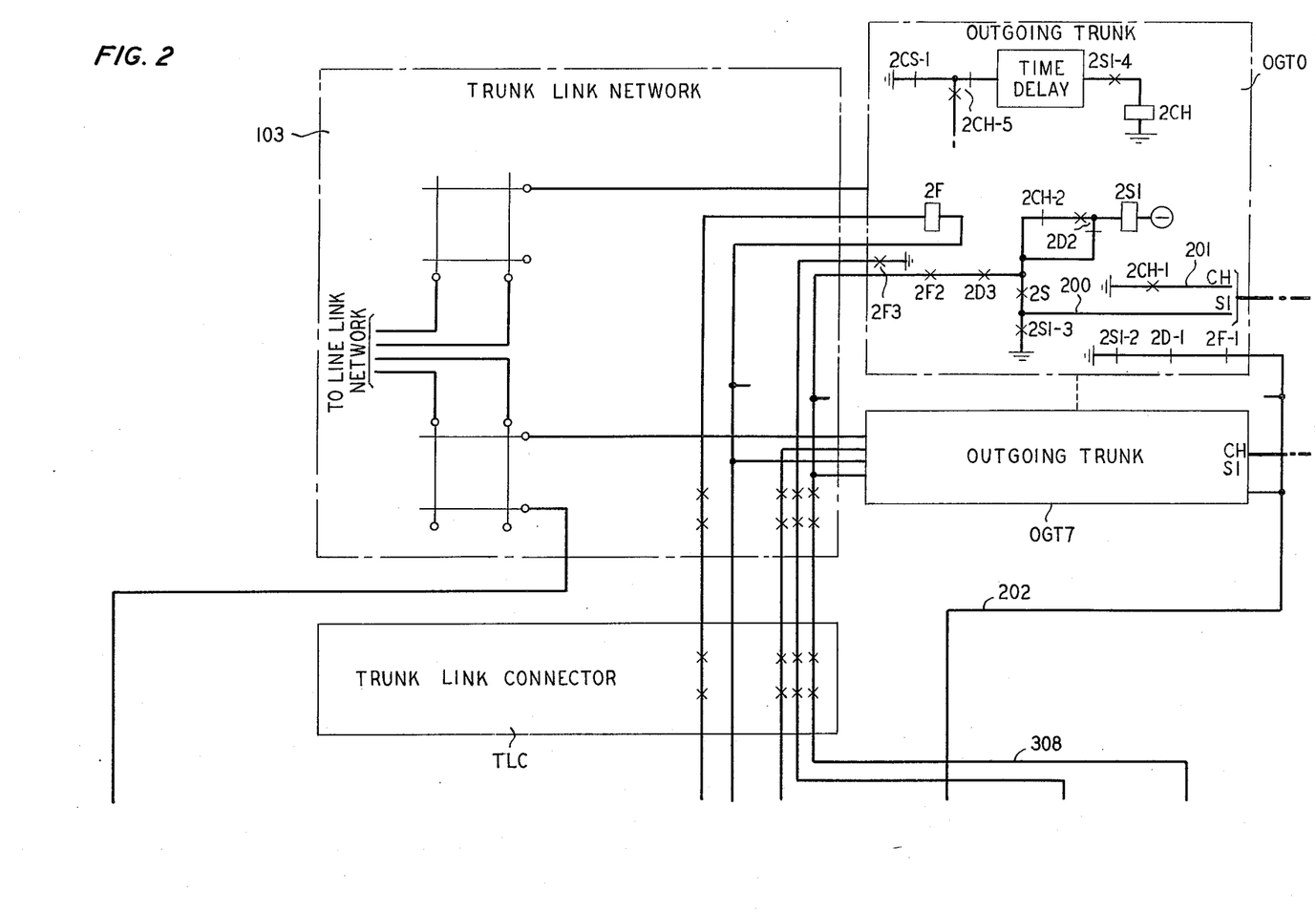
FIGS. 2–6, when arranged according to FIG. 7, show a more detailed schematic diagram of a portion of the telephone system and the apparatus for gathering billing information for calls being processed by the telephone system.
Figure 3:
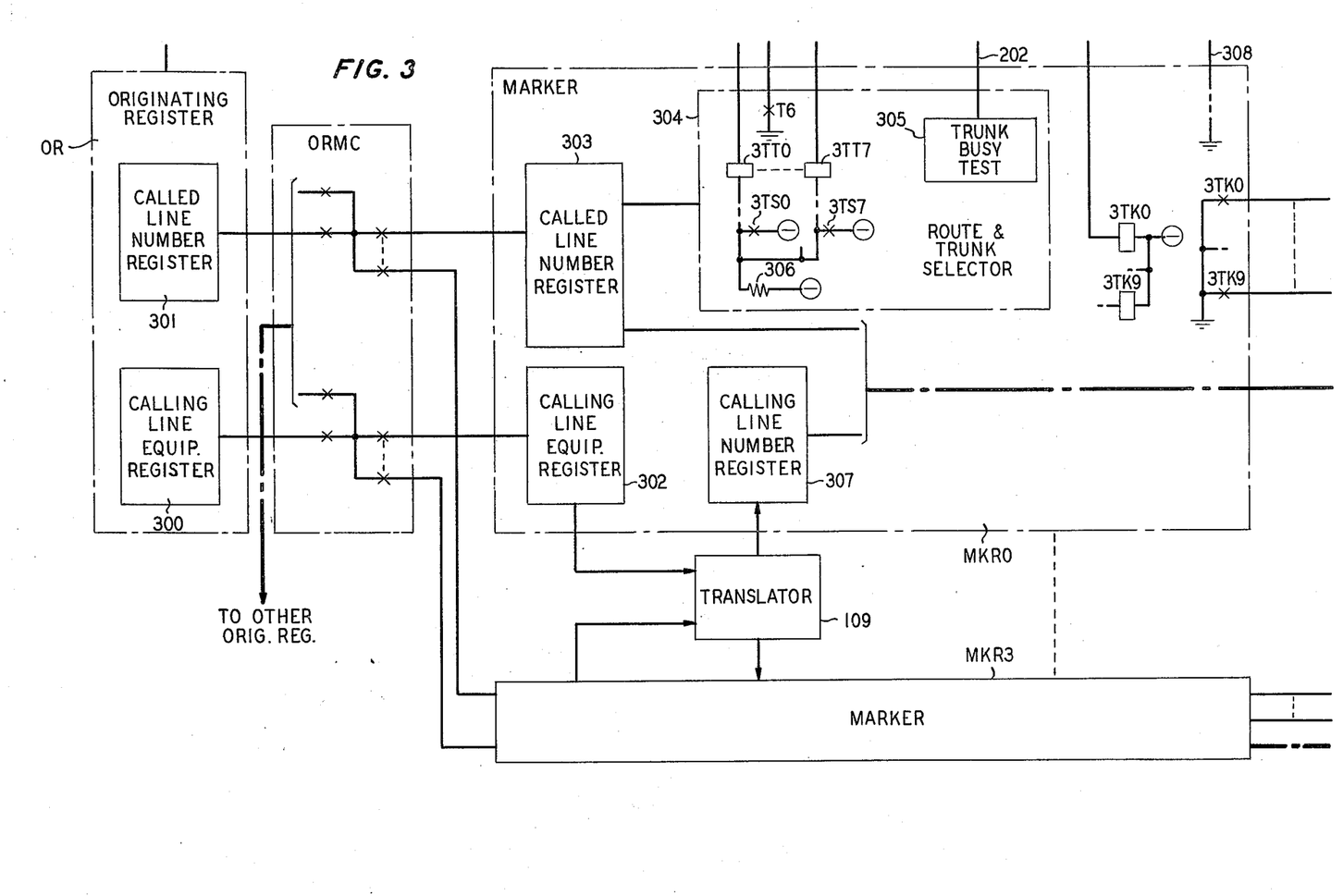
Figure 4:
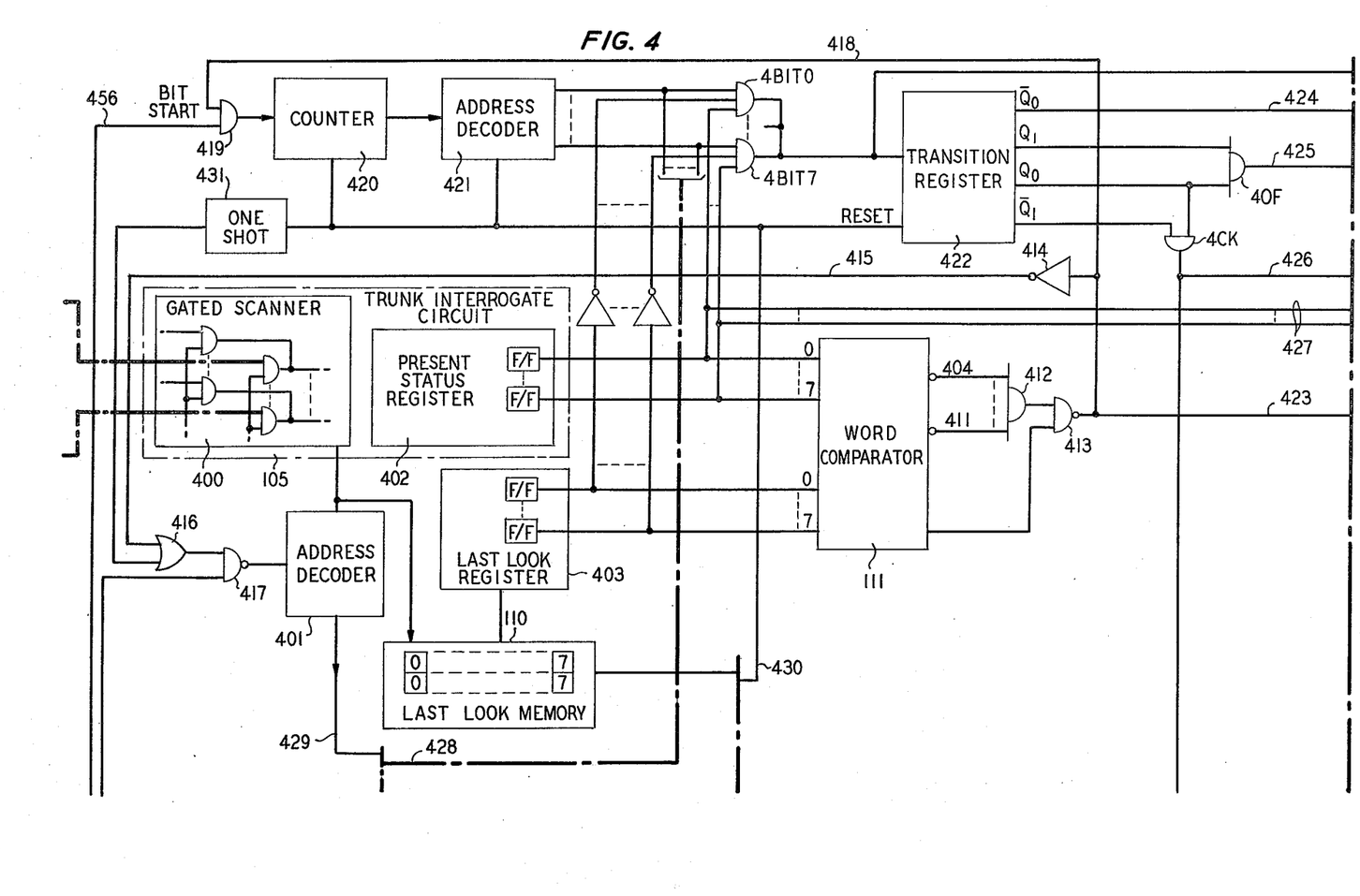
Figure 5:
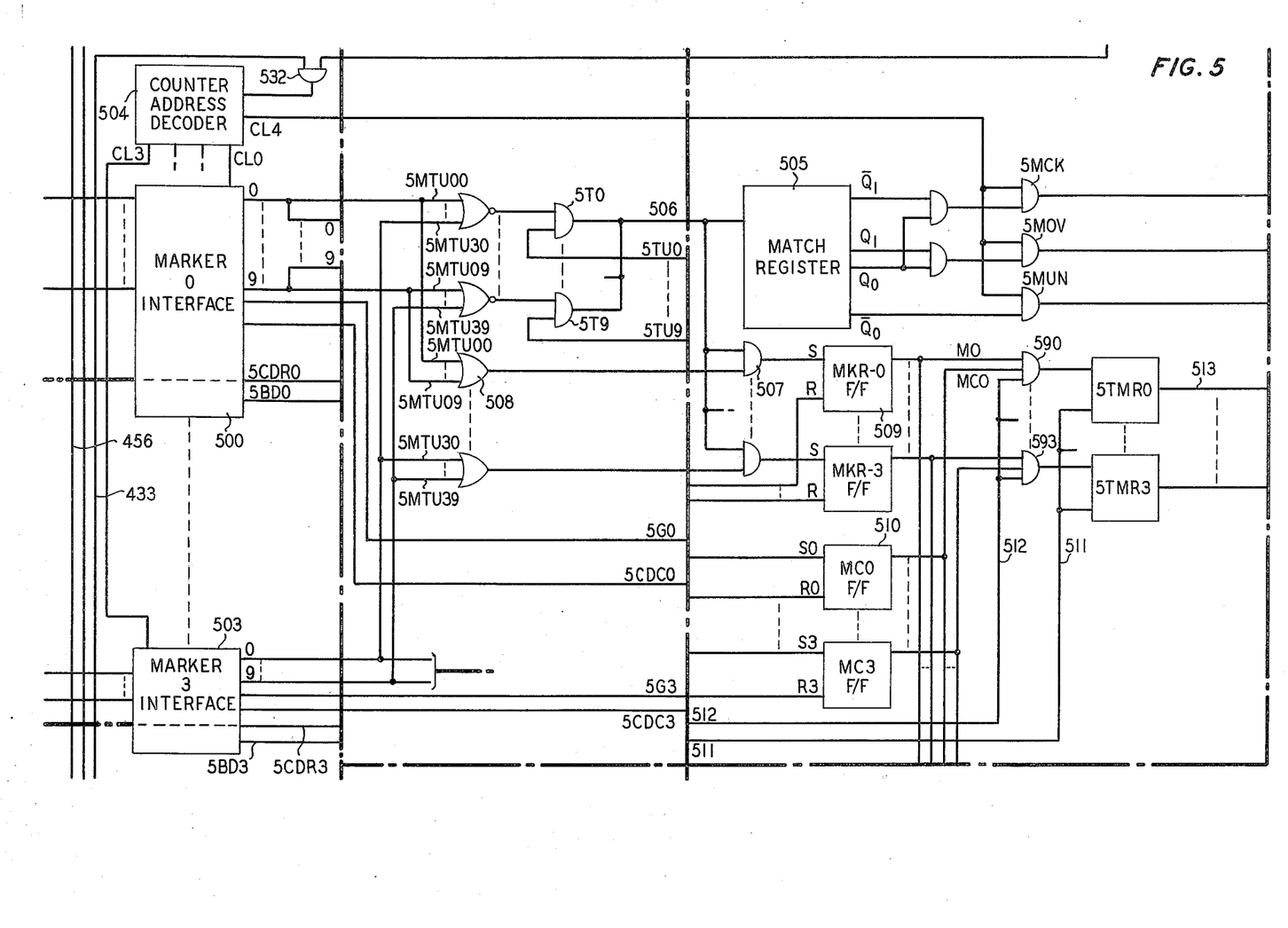
Figures 6, 7:
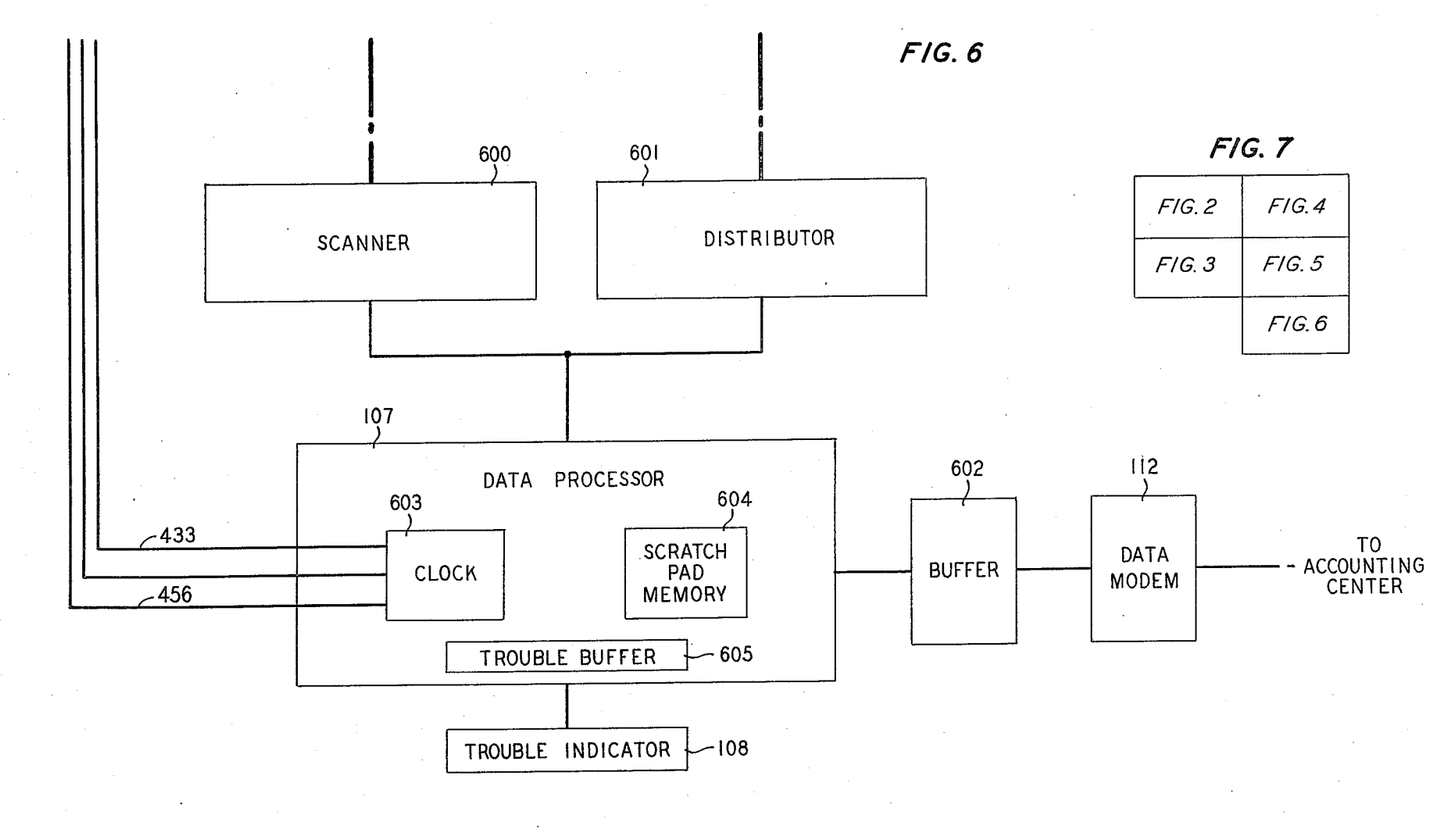

Turning now to FIGS. 2–6, when arranged according to FIG. 7, a more detailed description of the arrangement will now be given. FIG. 2 shows a portion of trunk link network 103 with trunks OGT0 through OGT7 and FIG. 3 shows a more detailed block diagram representation of marker MKR0 and originating register OR. FIG. 4 shows trunk interrogate circuit 105, comparator 111 and last-look memory 110, which are used for monitoring the trunk status while FIG. 5 shows the marker interrogate circuit 106 and FIG. 6 shows a typical data processor 107 with its interface scanner 600, distributor 601 and trouble indicator 108. If the billing data collected by data processor 107 is to be transmitted to a centralized accounting center, the system is provided with data modem 112 and buffer 602.

To illustrate the operation of the system let it be assumed that a customer has originated a call and the customer's line has been connected via the switching network to originating register OR, a portion of which is shown in FIG. 3. When the marker established the network connection between the calling line appearance and register OR, it stored the identity of the calling line equipment number in calling line equipment register 300 which is part of the originating register. Register OR returns dial tone to the calling customer and the customer dials the telephone directory number of the customer he wishes to call. The called directory number is stored in called line number register 301 and when the complete number has been stored in register 301, originating register OR bids for the services of a marker via originating register marker connector ORMC. Assuming that marker MKR0 is idle, register OR is connected to marker MKR0 and the calling line equipment number and the called telephone directory number are transmitted via originating register marker connector ORMC to similar storage registers 302 and 303, respectively, in the marker.

Marker MKR0 translates the office code digits of the called number to ascertain the proper trunk route required to establish a connection to the called customer. The equipment for performing this function is represented by route and trunk selector circuit 304 in FIG. 3, and is more fully described in the aforementioned Busch patent. Briefly, the marker seeks an idle trunk on an idle trunk link frame in the appropriate route to the called customer using trunk busy test circuit 305. Once having found a trunk link frame having idle trunks in the appropriate route, marker MKR0 seizes the trunk line frame via trunk link connector TLC and locates which trunks are idle on the frame. The idle trunks are identified by the operation of one or more of the relays designated 3TT0 through 3TT7. Relays 3TT— operate from a circuit including ground in the marker, the winding of a relay in the trunk circuit such as relay 2F in trunk OGT0, the winding of relay 3TT— and battery through high resistance 306. Marker MKR0 goes through a series of operations resulting in the operation of a trunk select relay 3TS-13. Assuming that trunk OGT0 is to be selected, relay 3TS0 operates to connect low resistance battery to the winding of relay 3TT0 which causes relay 2F in the trunk to operate in series with relay 3TT0. When relay 2F operates it removes ground from trunk busy test lead 202 so that trunk OGT0 no longer appears idle to the markers.

In processing the call, marker MKR0 also recognizes that a detailed billing of the call will be required so marker MKR0 translates the calling line equipment number into the telephone directory number to which the call is to be billed. Marker MKR0 utilizes translator 109 to perform this function and the telephone directory number received from translator 109 is stored in calling line number register 307.

Once having selected an idle trunk, marker MKR0 seizes the line link frame on which the calling line is located and establishes a communication path between the calling line equipment and trunk OGT0. Marker MKR0 then transmits ground over conductor 308, through make contacts in the trunk link connector and the trunk link frame, through make contacts 2F2 and 2D3 in the trunk, through break contacts 2CH2, make contact 2D2 and the winding of relay 2S1 to battery thereby operating relay 2S1. Relay 2S1 holds the communication path to the calling line while the marker performs various tests on the path. In addition, at its contacts 2S1-3, relay 2S1 transmits ground over S1 conductor 200 to gated scanner 400 in FIG. 4.

Gated scanner 400 is part of trunk interrogate circuit 105 and monitors the status of all trunks originating at the telephone switching office. In this illustrative embodiment, the condition of the trunk can be determined by monitoring the S1 and CH conductors associated with each trunk. For example, when both S1 conductor 200 and CH conductor 201 associated with trunk OGT0 are low, (i.e., absence of ground) the trunk is in its idle state. When S1 conductor 200 is high, (i.e., grounded) and CH conductor 200 is low, this indicates that trunk OGT0 has been seized for service. The presence of a high on CH conductor 201 following the high on S1 conductor 200 indicates that the called customer has answered and trunk OGT0 is in a charging condition. Once having detected a high on CH conductor 201, if the high on S1 conductor 200 is subsequently removed, the accounting system recognizes this as a trunk disconnect signal.

Gated scanner 400 performs directed scanning operation under the control of address decoder 401 and address decoder 401 generates addresses for gated scanner 400 and last-look memory 110 in response to pulses from clock 603. Thus, with each clock pulse, an address is generated in decoder 401 and simultaneously transmitted to scanner 400 and last-look memory 110. With the reception of each address, the current status of eight trunks is gated from the scanner into present status register 402. Register 402 comprises a plurality of storage devices which are enabled in accordance with the busy or idle status of each trunk being examined. At the same time the address is transmitted to last-look memory 110 where the contents of the addressed location are read out into last-look register 403. Last-look memory 110 comprises a plurality of address locations each containing a number of memory cells and each memory cell represents the status of a trunk as determined by the last scanning cycle.

The outputs of the present status register 402 and the last-look register 403 are applied to word comparator 111 to ascertain if any of the eight trunks in the group being examined have changed status since the last scanning cycle. In word comparator 111 the present status and last-look status are subtracted from each other to determine a change of status. A zero result on all output conductors 404 through 411 indicates no change in status and this enable gates 412 and 413. The output of gate 413 is inverted by inverter 414 and transmitted over conductor 415 to start control OR gate 416 and NAND gate 417. The signal from NAND gate 417 will permit address decoder 401 to generate a new address with each clock pulse thus continuing the trunk scanning operation.

A non-zero output from comparator 111 transmits a signal over conductor 418 to partially enable bit start gate 419. AND gate 419 is enabled with the next clock pulse on conductor 456 to advance counter 420. Counter 420 enables address decoder 421 which generates the eight addresses associated with AND gates 4BIT0 through 4BIT7. Each gate 4BIT— is interrogated in succession to ascertain which of the eight trunks has changed state. The output of decoder 421 along with the output of the present status register 402 and the inverted output of the last-look register 403 are connected to the inputs of AND gates 4BIT0 through 4BIT7, and each gate is interrogated for an output. An idle-to-busy transition on an S1 lead such as lead 200, will cause an output from gate 4BIT0 which is recognized by transition register 422.

A non-zero output from comparator 111 also transmits a signal over conductor 423 to scanner 600. Data processor 107 routinely scans many scan points associated with the accounting system via scanner 600 and when a signal is detected on the scan point associated with conductor 423, processor 107 updates last-look memory 110 with the current status of the trunk group being scanned.

The output of transition register 422 appears at Q0, Q1, $\overline{Q0}$ and $\overline{Q1}$. Q0 and $\overline{Q1}$ are ANDed together to enable check gate 4CK and transmit a signal over conductor 426 to scanner 600. The signal on conductor 426 indicates to data processor 107, that one and only one trunk has changed state since the last scan and data processor 107 scans conductors 428 and 429 to ascertain the address of the trunk that has changed state. This address is then entered into scratch pad memory 604 in data processor 107.

A signal on outputs Q0 and Q1 of transition register 422 enables overflow gate 4OF to indicate to the processor that more than one trunk in a unit has changed state since the last scanning cycle. This, however, is an invalid indication since the system is designed to scan all trunks in a unit at a rate sufficiently fast enought to detect each change of state. If more than one change of state is detected on one trunk unit scan, the processor exercises a trouble analysis routine to ascertain the nature of the trouble.

If there is an output signal from transition register 422 on only output Q0 this is transmitted to data processor 107 as an indication that none of the eight trunks being interrogated has changed state. This condition is also interpreted by the processor as a trouble condition since the processor has already recognized a change of state between the last-look and present status of the group of eight trunks as indicated by word comparator 111 and yet transition register 422 does not indicate any one of these trunks as having changed its state.

Assuming that no trouble conditions exist, processor 107 enters in scratch pad memory 604 the trunk number of the trunk that has changed state. The processor then transmits a reset pulse over conductor 430 to reset counter 420, address decoder 421 and transition register 422. The signal on conductor 430 also triggers one-shot 431 which enables gates 416 and 417 to advance address decoder 401 to the next address where the trunk scanning function resumes.

Up to this point, the processor has recognized a transition in trunk OGTO going from its idle state to its busy state and the address of that trunk has been recorded in scratch pad memory 604. In this illustrative embodiment of the invention, the trunks are divided into ten trunk units. Assuming that trunk OGT0 is in unit 0, data processor 107 signals via distributor 601 over conductor 5TU-0 to partially enable AND gate 5T-0 indicating that the seized trunk is in trunk unit 0. The accounting system now prepares to ascertain which marker has caused trunk OGT0 to change state. This, of course, will be the marker that is processing the call on trunk OGT0 and will contain all of the billing information necessary for charging the calling customer.

It will be recalled that a valid output on transition register 422 enabled gate 4CK and signaled processor 107 that a valid change of state in one trunk had taken place. The output of gate 4CK also partially enables AND gate 532, which is fully enabled, by the next clock pulse on conductor 433. AND gate 432 enables counter and address decoder 504 which generates addresses to interrogate each of the marker interface circuits 500 through 503 in succession.

As each marker is engaged with a trunk unit during the processing of a call the marker records the identities of the trunk unit on one of its relays 3TK0 through 3TK9. In the example being described it has been assumed that trunk OGT0 is in trunk unit 0 and that marker MKR0 is engaged on the call. Marker MKR0 will then have its relay 3TK0 operated to extend ground to interface circuit 500.

Interface circuits 500 through 503 provide buffering circuitry to permit the telephone switching equipment to interface with the data processing accounting equipment since the systems function automonously and may operate at different speeds.

When counter and address decoder 504 generates the address for interface 500 a signal is transmitted over conductor CL0 to interface 500 and this signal gates information from the marker to register circuits in the interface circuit. Since marker MKR0 is actively working in trunk unit 0 and trunk unit 0 contains the trunk OGT0 that experienced the idle to busy transition, coincidence exists at AND gate 5T0 and a logic one is transmitted to match register 505. Each time a match occurs a logic one is shifted into match register 505, however, the telephone switching system in this embodiment has been designed so that only one marker can be active with one trunk unit at any given time. Therefore, only one valid match should occur and this is indicated by the enabling of match check gate 5MCK after all interfaces have been polled and decoder 504 addresses conductor CL4.

When a match occurred and a logic one was transmitted over conductor 506 to match register 505, AND gate 507 was enabled by the coincidence of the match signal and a signal from OR gate 508 associated with marker interface 500. AND gate 507 sets flip-flop 509 indicating that a match occurred with marker MKR0.

Each time one of the marker interface circuits 500 through 503 is enabled, the information on the 5MTU—conductors is also transmitted to scanner 600. During routine operation the processor 107 uses scanner 600 to read this information into trouble buffer 605. Match register 505 indicates a match underflow by the enablement of gate 5MUN when no match is found between a marker and a trunk unit. On the other hand, register 505 indicates a match overflow by the enablement of gate 5MOV when more than one match is found. Either condition, i.e., a match underflow or overflow causes processor 107 to unload its trouble buffer into trouble indicator 108 to signal maintenance personnel of an irregular condition in the system.

Assuming that only one match condition occurred (gate 5MCK enabled) processor 107 purges its trouble buffer 605 and removes the trunk number stored in scratch pad memory 604, the trunk number is transmitted via distributor 601 over bus 511 to transition memory registers 5TMR0 through 5TMR3, however, only one register is activated by its associated gate 590 through 593. In the example being described, gate 590 would be enabled by the output of flip-flops 509 and 510 in their set state and a gating signal from the processor over conductor 512. It will be recalled that flip-flop 509 is set when a matched condition is detected in marker MKR0. Marker clear flip-flop 510 is set by the processor indicating a zero content in the associated transition marker register 5TMR0. When the processor has entered the trunk number in register 5TMR0, processor 107 resets flip-flop 510.

At this time a unique trunk identity has been placed in the register 5TMR0 associated with marker MKR0. All other registers and the scratch pad memory can be purged and the processor can continue scanning other trunk units until all trunk units have been scanned.

Having completed the trunk scan function, the processor is programmed to perform the marker scan function. Processor 107 via scanner 600 interrogates call data ready leads 5CDR0 through 5CDR3 to ascertain which markers have assembled the calling line number, the called line number and any other information needed for billing the customer.

Let it be assumed that marker MKR0 has stored the appropriate billing information in its interface circuit 500 and has signalled processor 107 over its calling data ready lead 5CDR0. Processor 107 signals via distributor 601 and conductor 5G0 to gate the billing data stored in the interface circuit to scan points in scanner 600. In addition, processor 107 signals over bus 511 to read out the contents of register 5TMR0 over conductors 513 to scanner 600. Thus, the trunk number from register 5TMR0, the calling and called line number along with other billing information from the marker are available to processor 107. Processor 107 can accumulate this information in memory or load this information into buffer 602 for transmission to a distant accounting center where the data would be used to compile a customer's bill. Of course it will be realized that the billing information gathered thus far only pertains to the initial entry and in order to calculate the charges for a completed call, the processor must ascertain when the called party answers and the duration of the call. The called party answer supervision is detected by the trunk and the processor 107 can determine the answer and disconnect times by monitoring the S1 and CH conductors associated with the trunks via trunk interrogate circuit 105.

After the processor has recorded the data for the initial entry, it sends a call data check signal over conductor 5CDC0 to marker interface 500 to allow the marker to complete the processing of the call. If the marker fails to receive this signal, the marker will block and produce a trouble record of the call before attempting to complete the call via a different outgoing trunk.

What is claimed is:

1. For use in a communication system having a plurality of incoming lines, a plurality of outgoing lines and a plurality of control circuits each operative for selecting outgoing lines for connection to said incoming lines and for identifying said incoming lines, a message billing arrangement comprising
    means for detecting when one of said outgoing lines has been selected for connection to a calling one of said incoming lines requesting service,
    means responsive to said detecting means for ascertaining which of said control circuits is establishing a connection between said selected outgoing line and said calling incoming line, and
    means responsive to said ascertaining means for recording from said control means the identity of said calling incoming line and for recording the identity of said selected outgoing line connected thereto.

2. The invention defined in claim 1 wherein said detecting means comprises means for identifying each said outgoing line that changes from an idle state to a busy state, and
    wherein said ascertaining means comprises means for interrogating each said control circuit to identify the particular outgoing line selected by one of said control circuits, and
    means for comparing the identity of one of said outgoing lines that changed state with the identity of said selected outgoing line.

3. The invention defined in claim 2 wherein said identifying means comprises first means for storing a first indication of the initial busy/idle status of each said outgoing line,
    second means for storing a second indication of a subsequent busy/idle status of each said outgoing line, and
    means for comparing said first and second indications to ascertain which of said outgoing lines has changed state.

4. The invention defined in claim 3 wherein said outgoing lines are divided into groups, wherein said first storing means comprises groups of memory cells, each said cell group being associated with one of said line groups and having a discrete address,
    wherein said second storing means comprises a multistage register and means responsive to an address code for connecting one of said line groups to said register, and
    wherein said comparing means comprises first means for matching the contents of said register with the contents of an addressed one of said cell groups and means for concurrently addressing said first storage means and said connecting means.

5. The invention defined in claim 4 wherein said comparing means comprises second means for matching the individual stages of said register with the individual cells of said addressed cell group for determining the individual outgoing line that changed from an idle to a busy state.

6. In a communication system
    a plurality of customer lines,
    a plurality of trunks,
    a plurality of control means each responsive to a calling one of said customer lines for recording the identity of said calling line and selecting an idle one of said trunks for connection to said calling line,
    means for detecting when one of said trunks has been selected for connection,
    means responsive to said detecting means for ascertaining the particular one of said control means that has selected said one trunk, and
    means controlled by said ascertaining means for storing the identity of said calling line recorded by said particular control means.

7. The invention defined in claim 6 wherein each said trunk is identified by an address, wherein each said control means comprises first register means for registering the address of the trunk selected by said control means, wherein said detecting means comprises means for monitoring a change of state of said trunks and second register means for registering the address of a trunk that changes from an idle state to a busy state, and
    wherein said ascertaining means comprises means for comparing the trunk addresses registered in said first and second register means.

8. The invention defined in claim 7
    wherein said monitoring means comprises means for periodically scanning said trunks to determine the busy/idle state of each said trunk, means for determining when a trunk has changed from an idle state to a busy state between successive scans and means for transmitting to said second register means the address of each trunk that changed from an idle state to a busy state.

9. The invention defined in claim 8
whereian said monitoring means further comprises
means for determining when only one, more than one and less than one trunk changes state.

10. In a telephone system
a plurality of customer lines,
a plurality of trunks,
a plurality of markers each responsive to a service request signal from a calling one of said lines for identifying said calling line and for selecting an idle trunk for connection to said calling line, and
a system for billing the customer lines in accordance with the connections established comprising
first means for periodically interrogating said trunks to identify a trunk that has been selected for connection by one of said markers,
second means responsive to said first interrogating means for interrogating each said marker to ascertain whether said interrogated marker has selected a trunk,
means for comparing the identity of the trunk selected by said interrogated marker with the identity of the trunk determined by said first interrogating means, and
means responsive to a match between the trunk identified by said first interrogating means and the trunk selected by said interrogated marker for recording the identity of the calling line identified by said interrogated marker.

* * * * *